US010238184B2

(12) United States Patent
Moran

(10) Patent No.: US 10,238,184 B2
(45) Date of Patent: Mar. 26, 2019

(54) LOCKING MECHANISM WITH ONE AND TWO-STAGE LOCKING VERIFICATION

(71) Applicant: Control Dynamics, Inc., Everett, WA (US)

(72) Inventor: Eric M. Moran, Camano Island, WA (US)

(73) Assignee: Control Dynamics Inc., Everett, WA (US)

( * ) Notice: Subject to any disclaimer, the term of this patent is extended or adjusted under 35 U.S.C. 154(b) by 251 days.

(21) Appl. No.: 15/065,582

(22) Filed: Mar. 9, 2016

(65) Prior Publication Data

US 2017/0000220 A1    Jan. 5, 2017

Related U.S. Application Data

(60) Provisional application No. 62/186,557, filed on Jun. 30, 2015.

(51) Int. Cl.
  *A44B 11/25*     (2006.01)
  *A44B 11/26*     (2006.01)
  (Continued)

(52) U.S. Cl.
  CPC .......... *A44B 11/26* (2013.01); *A44B 11/2519* (2013.01); *A44B 11/2569* (2013.01);
  (Continued)

(58) Field of Classification Search
  CPC ............ A44B 11/2519; A44B 11/2573; A44B 11/263; A44B 11/2569; A44B 11/266;
  (Continued)

(56) References Cited

U.S. PATENT DOCUMENTS 2,903,774 A     9/1959   Harley
3,090,092 A *   5/1963   Szemplak .......... A44B 11/2519
                                                    24/648
(Continued)

OTHER PUBLICATIONS

DB Industries, Inc., DBI SALA Manual, "DBI SALA EXOFIT," pp. 1-32; see p. 20.
(Continued)

*Primary Examiner* — Jack W Lavinder
(74) *Attorney, Agent, or Firm* — FisherBroyles LLP; Kevin D. Jablonski

(57) ABSTRACT

Apparatus and method of locking two devices to each other through a receiver base, a pair of pivoting locking tabs, each having first and second arms extending out from a pivot point, and an insert that is partially engaged within a cavity formed by the receiver base and locking tabs. The receiver base is configured to be engageable with a first device. The insert is configured to be engageable with a second device. An optional push button assembly that has a retractable lip is engageable with the receiver base to block rotational movement of the locking tabs unless the lip of the push button is retracted. The apparatus may also include magnetic actuators and corresponding electronic switches that provide two stage locking and, optionally, provide contact state signaling to an external controller and computer to verify locked/unlocked status of the insert relative to the receiver base cavity and locking tabs.

13 Claims, 16 Drawing Sheets

(51) Int. Cl.
*A44B 17/00* (2006.01)
*B60R 22/48* (2006.01)

(52) U.S. Cl.
CPC ........ *A44B 11/2573* (2013.01); *A44B 11/263* (2013.01); *A44B 11/266* (2013.01); *A44B 17/0005* (2013.01); *A44B 17/0041* (2013.01); *A44B 17/0076* (2013.01); *B60R 2022/4816* (2013.01)

(58) Field of Classification Search
CPC ... A44B 11/253; A44B 11/2511; A44B 11/26; A44B 17/0005; A44B 17/0041; A44B 17/0076; B64D 25/06
USPC .......................................................... 297/468
See application file for complete search history.

(56) References Cited

U.S. PATENT DOCUMENTS

| | | | |
|---|---|---|---|
| 3,644,967 | A | 2/1972 | Romanzi, Jr. et al. |
| 5,033,171 | A | 7/1991 | Kasai |
| 5,144,725 | A | 9/1992 | Krauss |
| 5,383,257 | A | 1/1995 | Krauss |
| 5,548,879 | A | 8/1996 | Wu |
| 5,556,415 | A | 9/1996 | McEwen et al. |
| 6,668,434 | B2 | 12/2003 | Casebolt et al. |
| 6,965,231 | B1 | 11/2005 | Cinoglu et al. |
| 7,077,372 | B2 | 7/2006 | Moran |
| 7,114,225 | B2 * | 10/2006 | Casebolt ............ A44B 11/253 24/634 |
| 7,261,264 | B2 | 8/2007 | Moran |
| 7,375,517 | B1 | 5/2008 | Cinoglu et al. |
| 7,726,706 | B2 | 6/2010 | Moran |
| 7,902,960 | B2 | 3/2011 | Tsuchimochi et al. |
| 8,240,012 | B2 | 8/2012 | Walega et al. |
| 2002/0145515 | A1 | 10/2002 | Snowbarger et al. |
| 2002/0170783 | A1 | 11/2002 | Goode |
| 2002/0184742 | A1 | 12/2002 | Casebolt et al. |
| 2006/0048350 | A1 | 3/2006 | Coulombe et al. |
| 2006/0222287 | A1 | 10/2006 | Gulvin et al. |
| 2009/0078501 | A1 | 3/2009 | Mordecai et al. |
| 2009/0243892 | A1 | 10/2009 | Cheung |
| 2010/0013622 | A1 | 1/2010 | Rumps et al. |
| 2010/0026025 | A1 | 2/2010 | McKay |
| 2010/0101060 | A1 | 4/2010 | Walega et al. |
| 2010/0243373 | A1 | 9/2010 | Johnson et al. |
| 2011/0162177 | A1 | 7/2011 | Von Der Ahe et al. |
| 2011/0239413 | A1 | 10/2011 | Milbright |
| 2012/0124790 | A1 | 5/2012 | Richards |
| 2014/0067668 | A1 | 3/2014 | Bellamy et al. |
| 2014/0251725 | A1 | 9/2014 | Schurian et al. |
| 2014/0298630 | A1 | 10/2014 | Hortnagl |
| 2015/0074958 | A1 | 3/2015 | Hung |
| 2015/0089777 | A1 | 4/2015 | Hung |
| 2017/0000219 | A1 | 1/2017 | Moran |

OTHER PUBLICATIONS

Guardian Fall Protection, Instruction Manual, "Velocity SRL," pp. 1-7.
International Search Report and Written Opinion issued in connection with PCT/US2016/028985, dated Jul. 14, 2016, 11 pages.
International Searching Authority of WIPO; International Search Report & Written Opinion dated Jul. 27, 2018; PCT Appl No. PCT/US2018/030703; pp. 1-15.
European Patent Office; Extended European Search Report dated Nov. 23, 2018; EP Application No. 16818381.2; pp. 1-8.

* cited by examiner

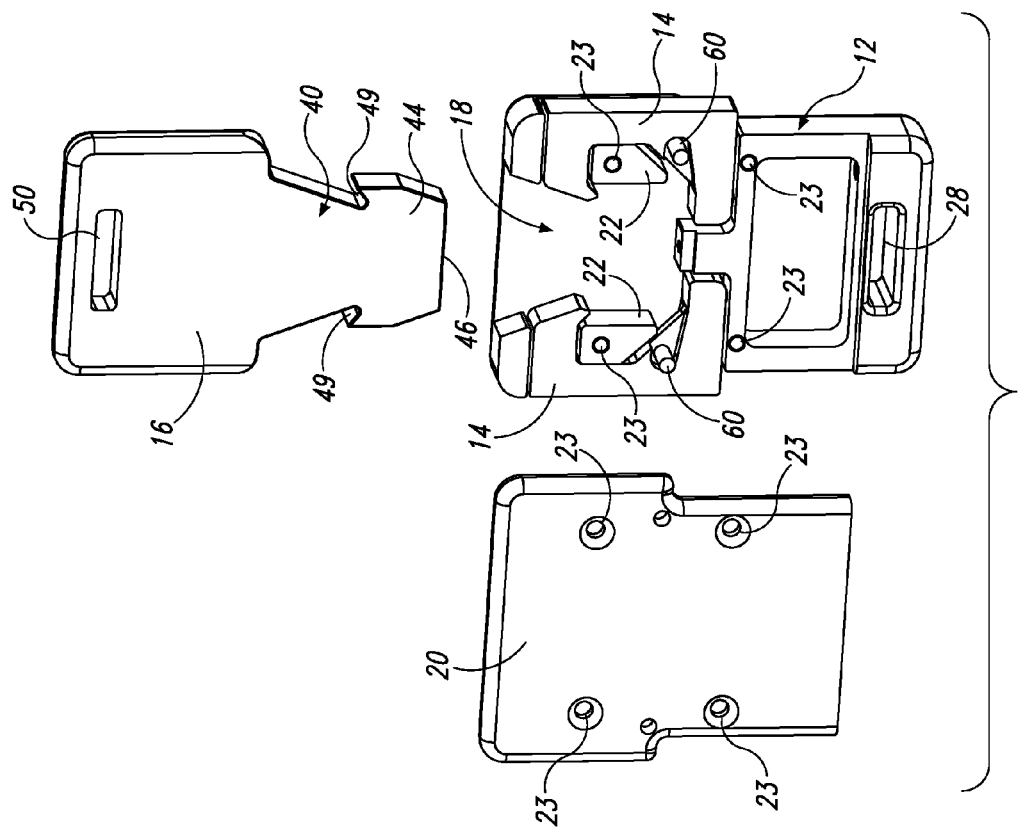
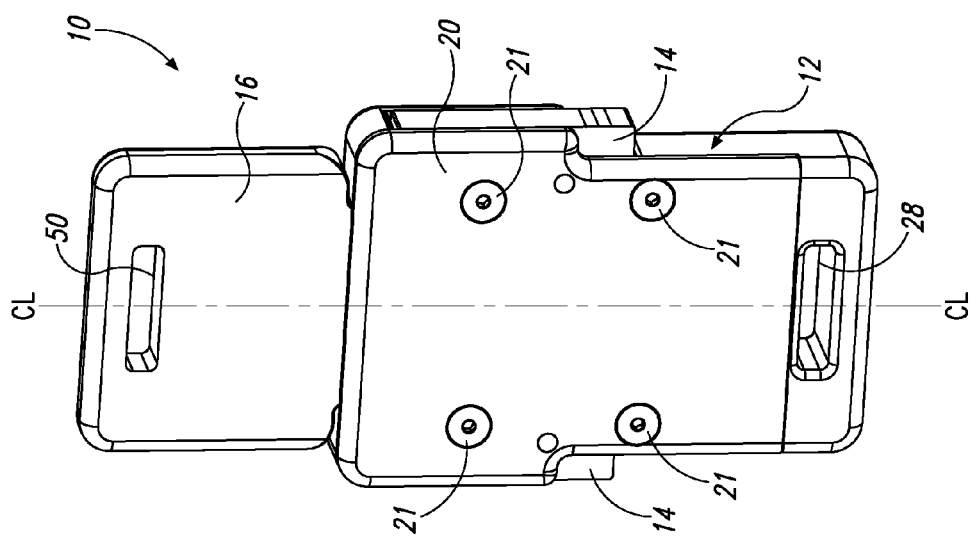

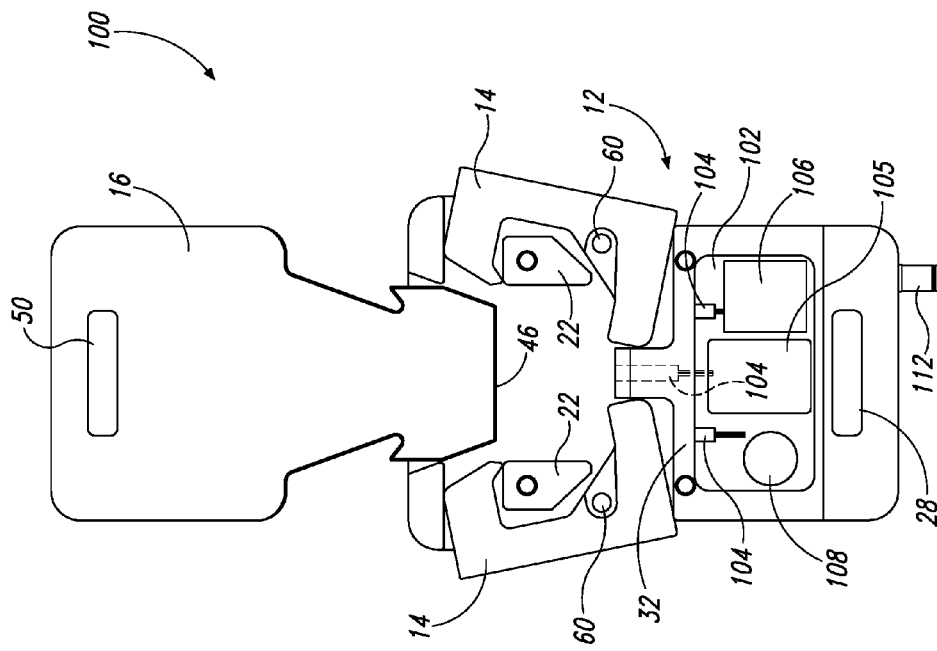
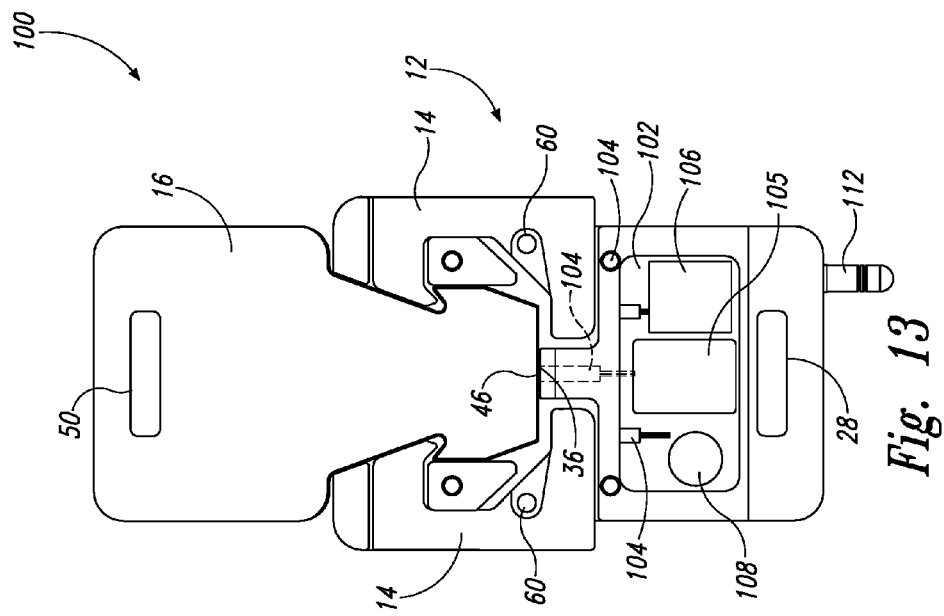

LOCKING MECHANISM WITH ONE AND TWO-STAGE LOCKING VERIFICATION

RELATED APPLICATIONS

This application claims priority to U.S. provisional patent application Ser. No. 62/186,557, filed on Jun. 30, 2015, the contents of which are fully incorporated herein by reference.

TECHNICAL FIELD

The invention pertains to locking mechanisms that have one and two-stage locking verification capabilities through mechanical and electro-mechanical means with two and three point unlocking means.

BACKGROUND OF THE INVENTION

A need exists for an improved locking mechanism, particularly with a two-stage locking verification for dangerous applications such as releasing a worker strapped into a safety harness from a lifeline. Current known connectors can easily be bypassed.

SUMMARY OF THE INVENTION

The invention is directed to an improved locking mechanism that has mechanical (one stage) and electro/mechanical (two stage) locking verification. Further, the invention includes two and three point unlocking means.

The mechanical aspects of the invention include a receiver base, a pair of locking tabs, and an insert. Each locking tab has a first arm and a second arm where each arm is connected at a pivot point. Each locking tab is configured to pivot about the pivot point that is operatively connected to an upper portion of the receiver base in a spaced apart fashion to form a cavity between the receiver base and the locking tabs.

A lower portion of the receiver base is configured to be operably engageable with a first device.

A lower portion of the insert is configured to be received within a cavity and retained by at least the first arms of the locking tabs. An upper portion of the insert is configured to be operably engageable with a second device.

The lower portion of the insert is retained by the receiver base and locking tabs. To disengage, both locking tabs must be rotated to dislodge the insert. Such disengagement is the two point mechanical unlocking method.

Another aspect of the invention includes a push button assembly that has a retractable lip that is configured to engage with the receiver base and retains the second arms from the locking tabs from movement. Here, the push button would need to be depressed and retract the lip from the receiver base and from the two second arms at the same time a force is applied to the locking tabs to rotate the arms of each locking tab to disengage the insert from the cavity. Such disengagement described herein is the three point mechanical unlocking method.

The invention may further include electronic components including three magnetic actuators and corresponding electronic switches that signal change of state. The two second arms of the locking tabs and a leading edge of the insert respectively include the three magnetic actuators. The electronic switches, which may be magnetically activated reed switches, signal status change to an external controller and, optionally, an external computer. Change of status notification may be important on critical safety worksites where lack of mechanical and electronic connection can be life threatening.

These and other advantages will become more apparent upon review of the Drawings, the Detailed Description, and the Claims.

BRIEF DESCRIPTION OF THE DRAWINGS

Like reference numerals are used to designate like parts throughout the several view of the drawings, wherein:

FIG. 10 is a front perspective view of the locking assembly with the cover placed over the receiver base and the locking tabs;

FIG. 11 is an exploded front perspective view of FIG. 10;

FIG. 13 is a front view of the locking mechanism of FIG. 12;

FIG. 14 is a front exploded view of the insert removed from the receiver base and the pivotable locking tabs pivoted to allow release of the insert;

DETAILED DESCRIPTION OF THE INVENTION

Figure 1:
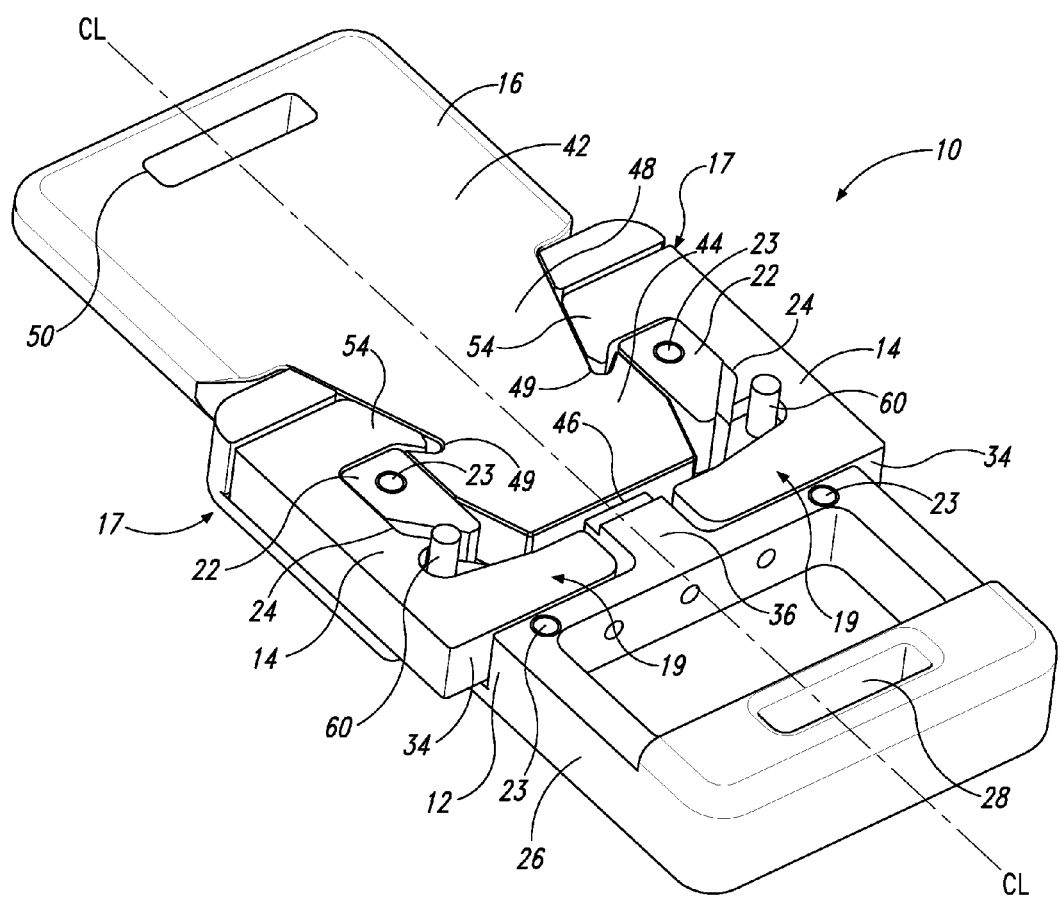
FIG. 1 is a front perspective view of an assembled locking mechanism of the first embodiment disclosing a receiver base, a pair of pivotable locking tabs about respective cylindrical posts, and an insert (illustrated without a cover)

Referring to FIGS. 1-11 and 16, locking mechanism 10 brings two devices together and maintains the connection until such time the connection is intentionally broken. Locking mechanism 10 includes a receiver base 12, a pair of pivotable locking tabs 14, and an insert 16 of which a portion is received within a cavity 18 of receiver base 12 and held in place by locking tabs 14. An optional cover 20 (FIGS. 6, 10) may cover the majority of receiver base 12 and the majority of locking tabs 14 through fasteners 21 received into apertures 23 (such as those illustrated) or other commonly known fastener means.

Receiver base 12 includes two spaced-apart and outwardly-projecting chocks 22 that conform to the shape of an interior surface 24 of locking tabs 14 and further define the boundaries of the cavity 18 in which a portion of insert 16 is received. Receiver base 12 also includes a lower section 26 that is configured to engage a first device. According to one embodiment of the invention, lower section 26 contains an opening 28. The opening may be an elongated slot (as illustrated in FIGS. 1-3 and 5) to accommodate a safety strap 30 (see FIG. 2 for example) that is operatively connected to a first device, such as a safety harness for example. Opening 28 may be aligned below cavity 18 relative to centerline CL of receiver base 12.

Receiver base 12 may also include a generally central ledge 32 to which bottom portions 34 of the locking tabs rest against when in the locked position. Receiver base 12 may also include an optional central abutment member 36 to which a portion of insert 16 abuts when the insert is fully engaged and in the locked position relative to the receiver base and engaged by the locking tabs (as illustrated in FIG. 1).

Figure 7:
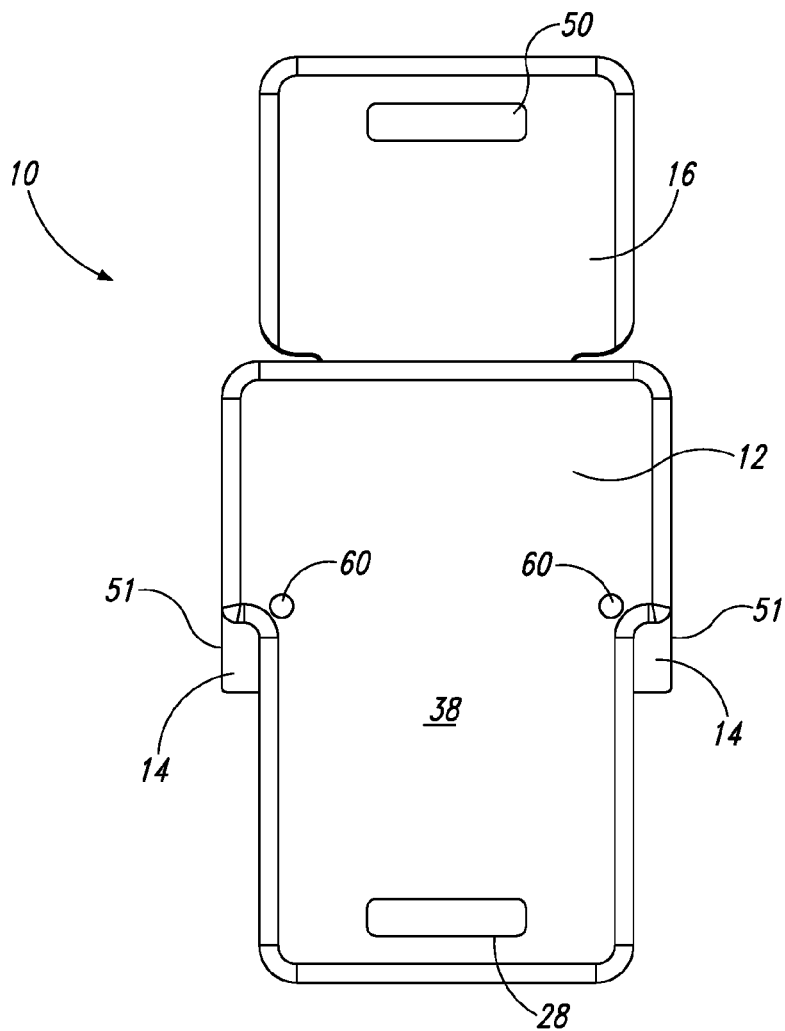
FIG. 7 is a back view of FIG. 1.
Figure 8:
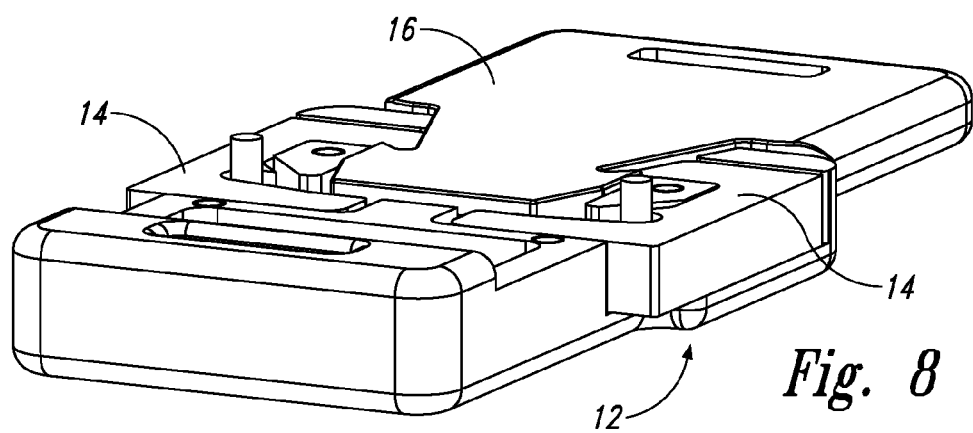
FIG. 8 is a rear perspective view of the assembled receiver base, locking tabs, and insert member.
Figure 9:
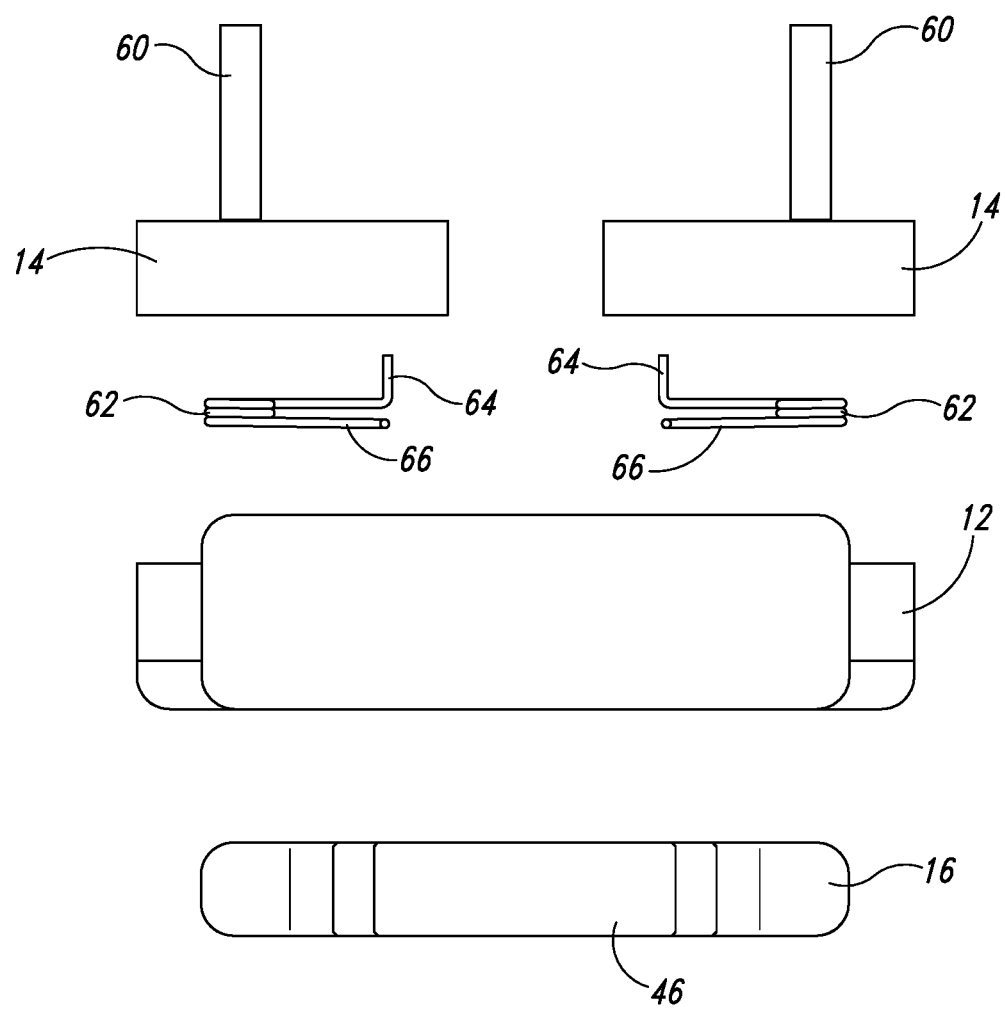
FIG. 9 is an exploded rear view of the receiver base, the insert, and the locking tabs and the cylindrical posts of FIG. 1.
Figure 12:
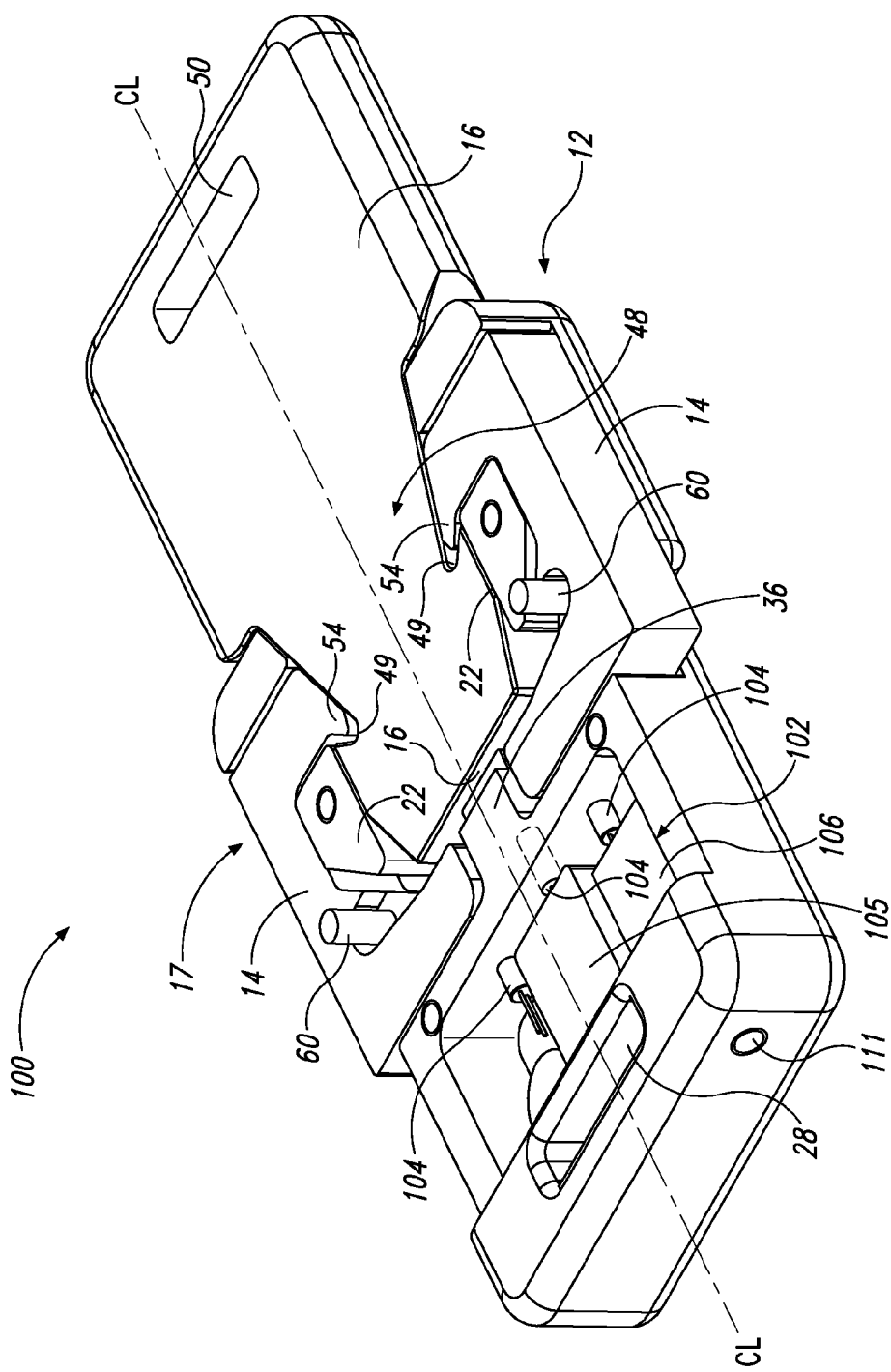
FIG. 12 is an assembled front perspective view of an alternate embodiment of the locking mechanism illustrating a receiver base, a pair of pivoting locking tabs, an insert, and an electronic bay with electronic components to provide a second stage of locking the locking mechanism (illustrated without a cover)
Figure 15:
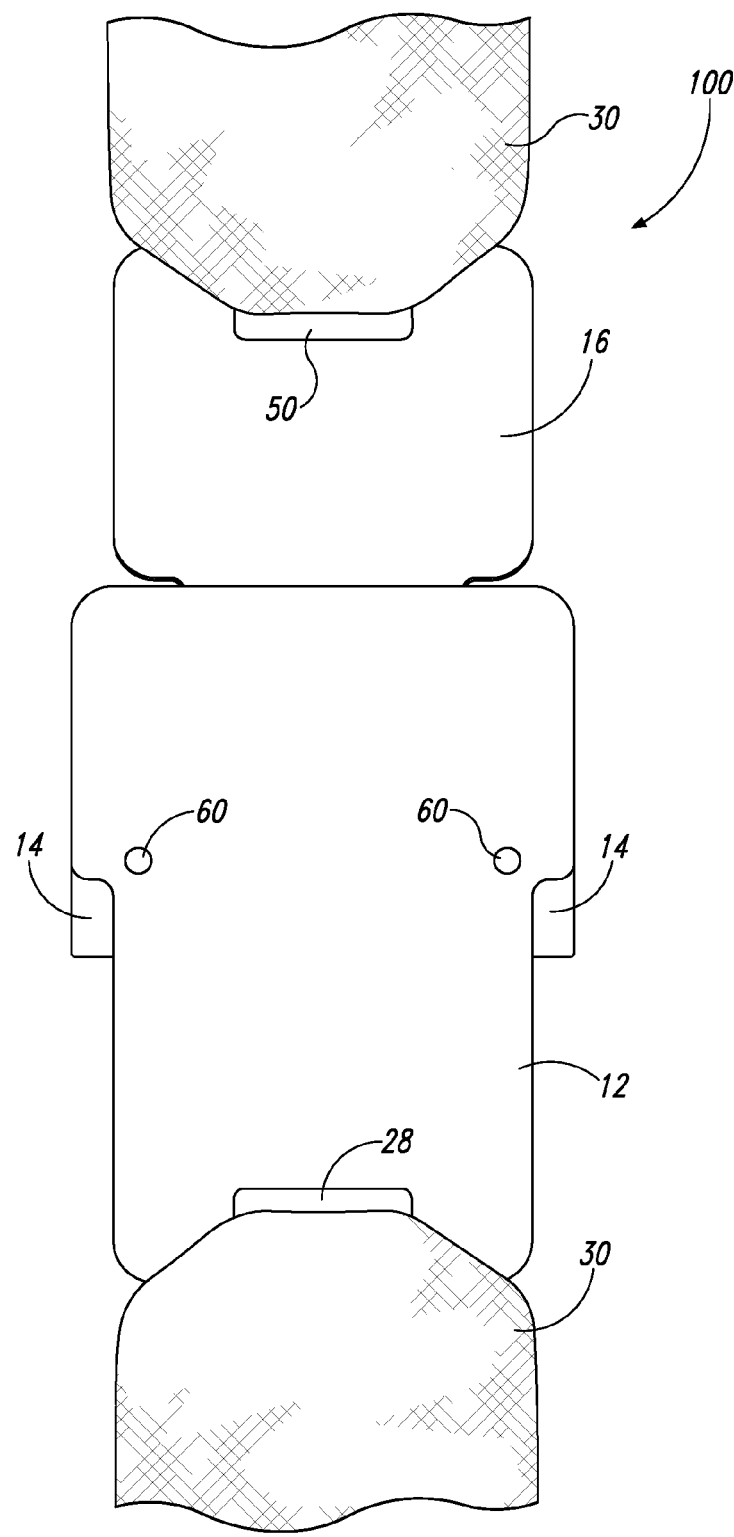
FIG. 15 is a rear view of FIG. 13.
Figure 16:
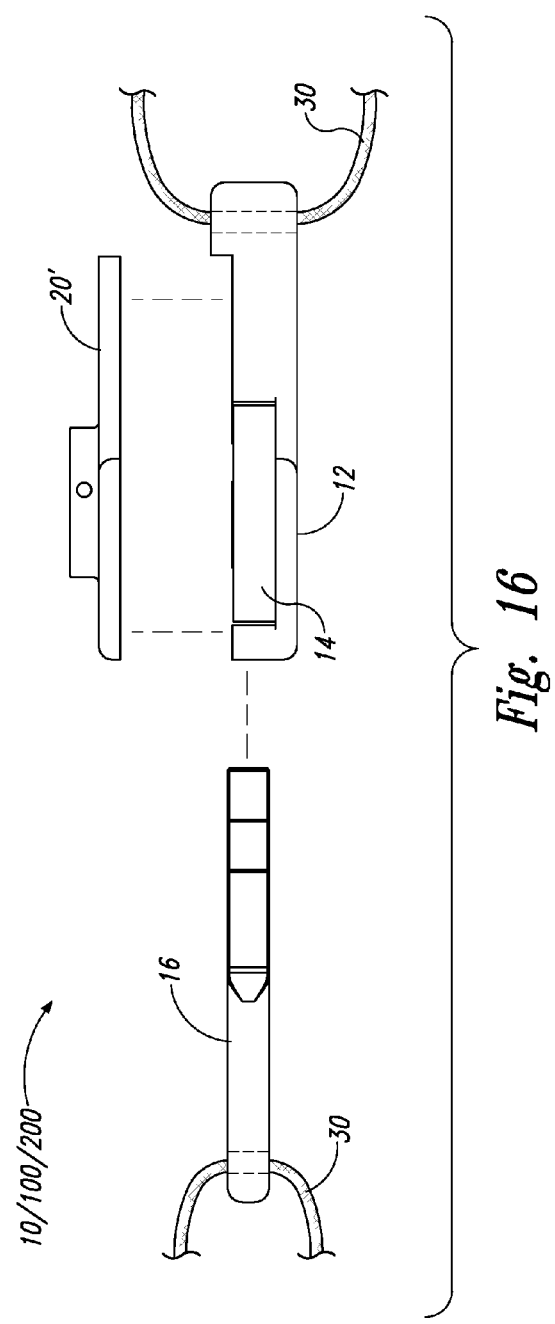
FIG. 16 is an exploded side view of the insert attached to a strap, the receiver base attached to a strap, and the cover.

According to one aspect of the invention, receiver base 12 has a planar back surface 38 (see FIG. 7). In one form of the invention, cover 20 also includes a smooth planar exterior surface 40 (see FIG. 6). When the cover is assembled onto the receiver base, the two major surface of the assembled locking mechanism are smooth, planar, and parallel to each other (see for example FIGS. 10 and 16).

Insert 16 may be in the form of a solid planar slab 42 having a lower portion that includes an external "key like" projection 44 having a leading edge 46. Between projection 44 and an upper portion is a transition section 48 that forms a pocket 49 on each side of transition section 48. In one form of the invention, the transition and the "key like" projection are received into cavity 18 of receiver base 12 along centerline CL when the insert is inserted into the receiver base in order to lock the locking mechanism. In the fully locked position, end surface 46 abuts the center ledge of the receiver base, or, alternatively, the central abutment member 36 as illustrated in FIG. 1. Opposite end surface 46 within slab 42 is an opening 50 that engages an object, such as a safety strap like safety strap 30. Opening 50 may be an elongated slot similar to opening 28 within receiver base 12.

Insert 16 is configured to be centerline-received into cavity 18 with "key like" projection 44 and at least part of transition section 48 being able to be inserted within cavity 18 formed by receiver base 12, locking tabs 14, and chocks 22. In one form of the invention, leading edge 46 abuts central ledge 32 or central abutment 36. Opening 50 within insert 16 is aligned above opening 28 of the lower portion of receiver base 12.

Locking tab 14 may be of various shapes. The locking tabs each have a first arm 17 and a second arm 19 extending outwardly from a central point (the pivot point) where the first arm, second arm and pivot may form a general "L" shape. The first arm engages the lower portion of the insert, i.e., the "key like" projection and at least a portion of transition section 48. According to one embodiment of the invention, each locking tab has a top portion 52 that may be configured with a hook nose 54, a side portion 56, and bottom portion 34 (already introduced above). Each locking mechanism has an exterior surface 51 adjacent the pivot point. Top portion 52, side portion 56, and bottom portion 34 form an elongated "c-shaped" cavity 58 that corresponds to the shape of chock 22. In one form of the invention, the locking tabs' outer surfaces (defined by the top portion, side portion, and bottom portion) have generally straight surfaces so that the exterior appears to be a partial rectangle. The second arm of each locking tab includes an upper surface 59 that is configured to contact leading edge 46 of insert 16 during unlocking. The second arm further includes a lower surface 61 that may rest on central ledge 32 of receiver base 12 when the locking mechanism is locked.

A cylindrical post 60 is inserted axially through bottom portion 34 and operatively connected to receiver base 12 (such as press fit connected into a tapped and threaded hole (see FIG. 3) or through other standard fastening means well known in the industry). In this way, bottom portion 34, side portion 56, and top portion 52 with nose 54 pivot about cylinder post 60 and are rotationally limited by its corresponding chock 22 and central ledge 32, as well as engagement with pocket 49 by nose 54 when insert projection 44 and at least a portion of the insert transition section 48 is inserted into cavity 18.

Figure 2:
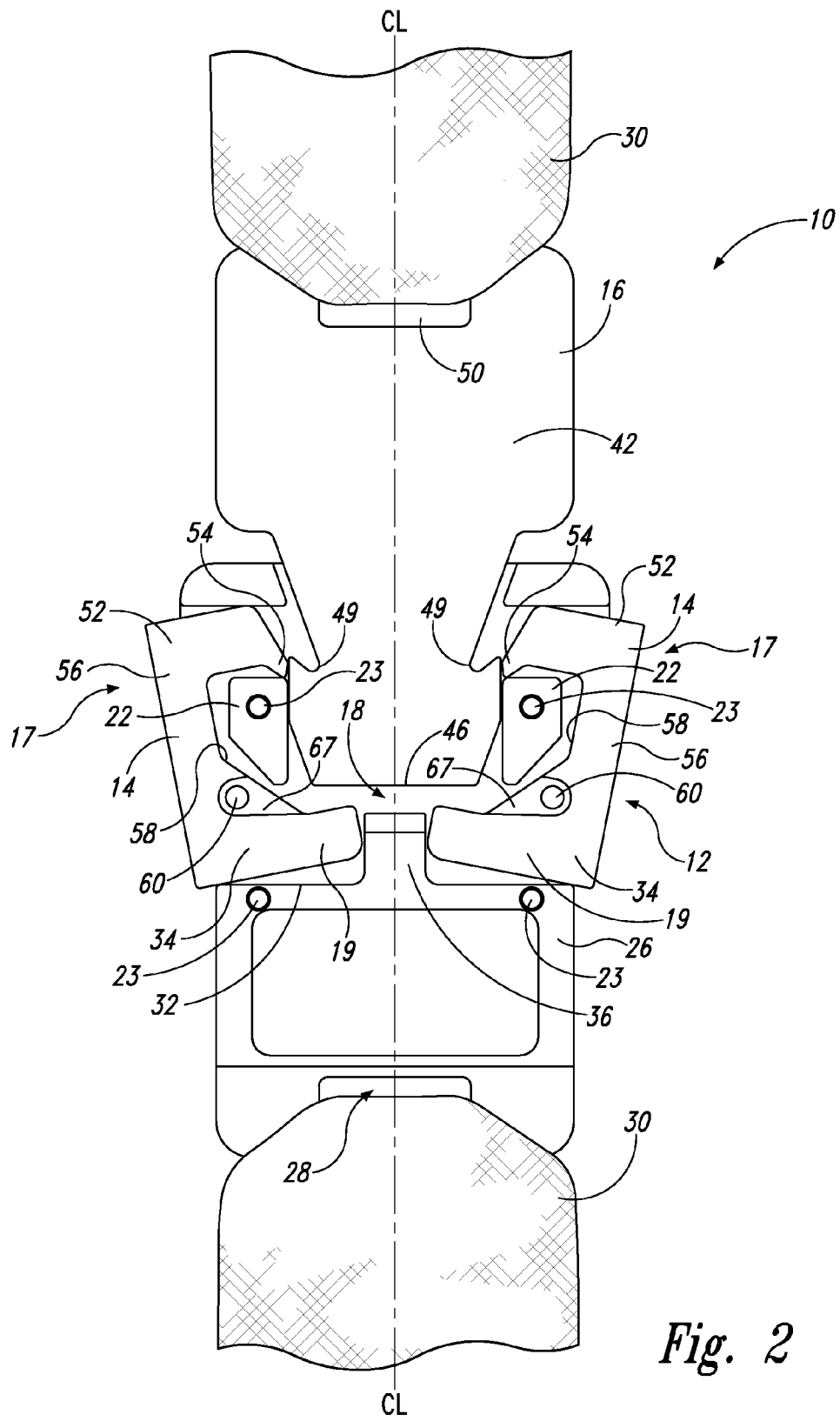
FIG. 2 is a front view of FIG. 1 with the pair of pivotable locking tabs pivoted to release the insert.
Figure 3:
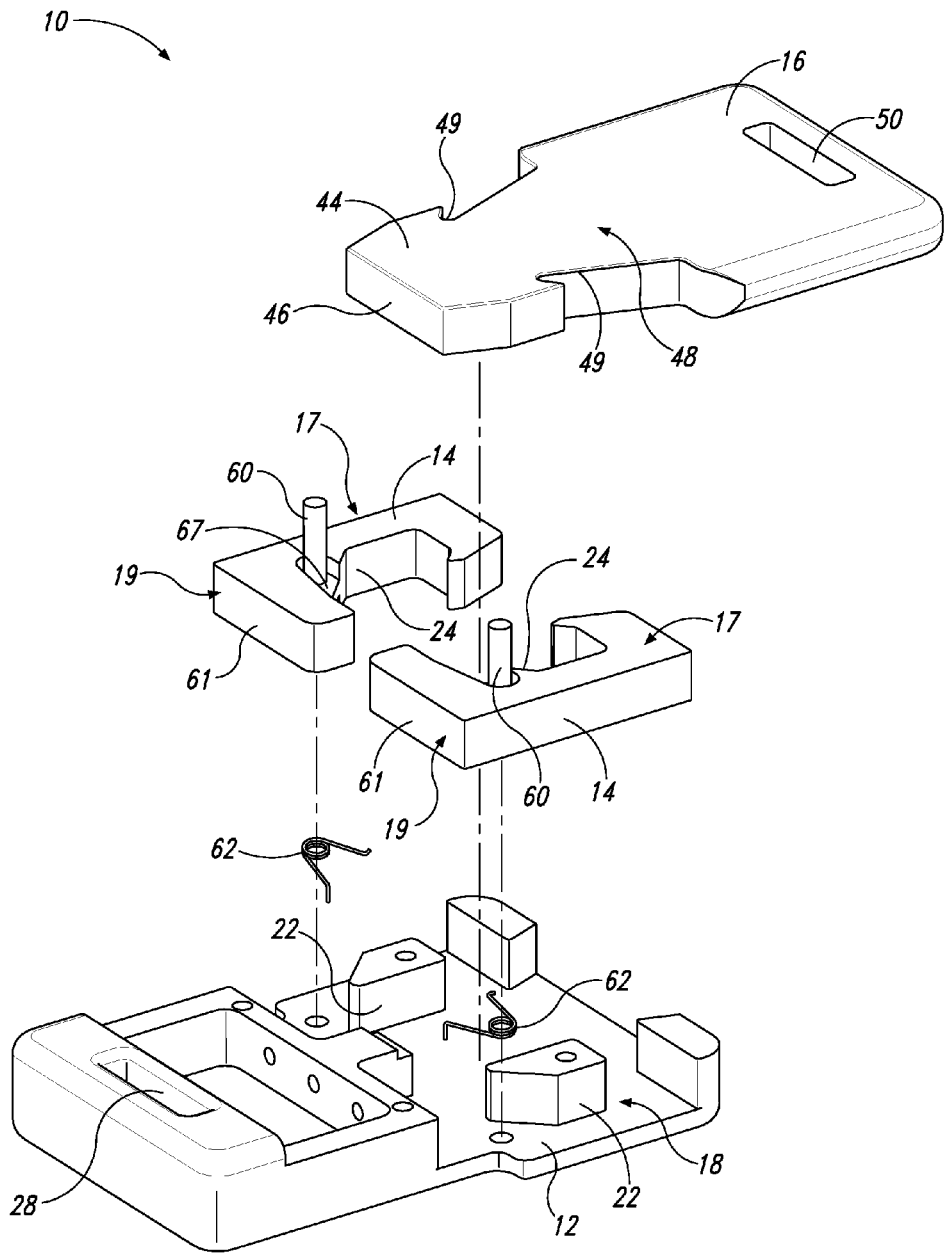
FIG. 3 is an exploded front perspective view like that of FIG. 1 except illustrated rotated 150 degrees and better illustrating a pair of pivot cylinders to which the locking tabs pivot about.
Figure 4:
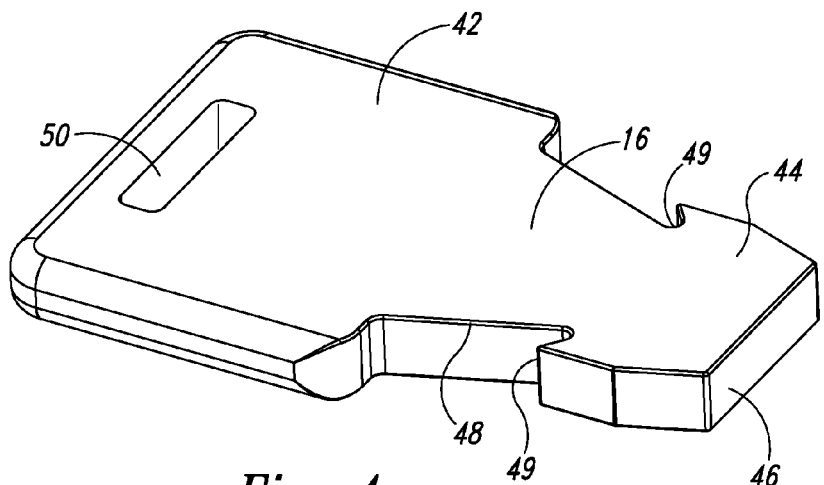
FIG. 4 is a front perspective view of the insert.
Figure 5:
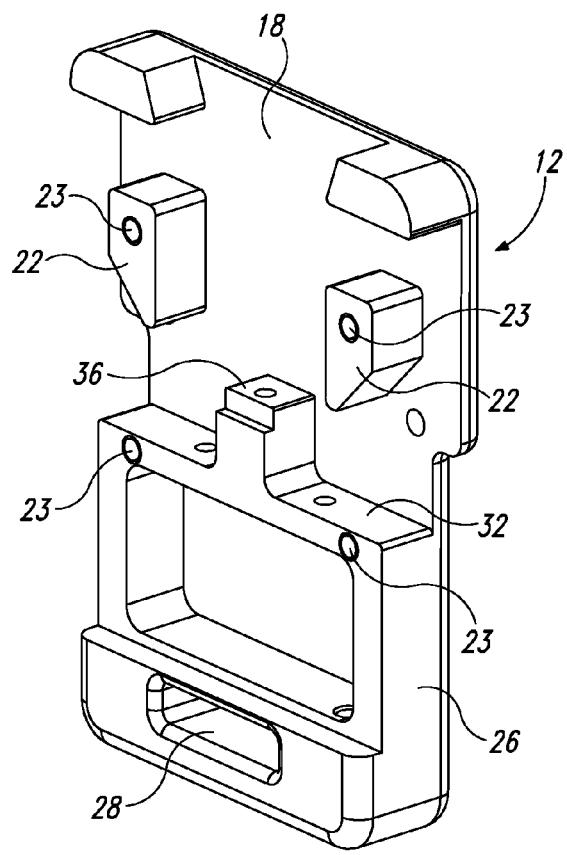
FIG. 5 is a front perspective view of the receiver base.
Figure 6:
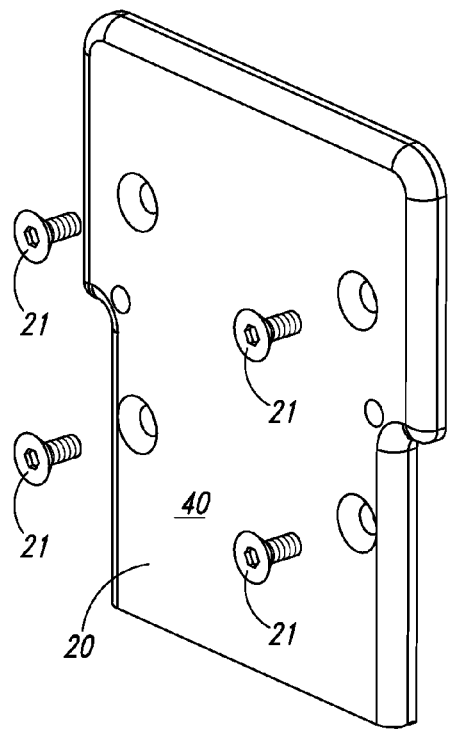
FIG. 6 is a front perspective view of a cover that covers over most of the receiver base when assembled.

A torsion spring 62 is positioned between the receiver base and each locking tab about cylindrical post 60. Each torsion spring includes a first arm 64 extending from one end of the coiled spring that biases its respective locking tab and a second arm extending from the other end of the coiled spring that biases the adjacent chock 22. The torsion spring for the right side locking tab is the mirror image of the torsion spring for the left side locking tab. The torsion spring allows rotational movement with an indented general arc on the back side of each locking tab about the pivot post (cylindrical post). The same general indented arc 67, but on the front side of the locking tab is illustrated in FIGS. 2 and 3.

When the locking mechanism is in the fully locked position (see FIG. 10), the exposed parts are mostly planar, which makes the locking mechanism less likely to get snagged or hooked during use. When the locking mechanism is unlocked, each first arm extends beyond outer edges of the receiver base. The extending first arms past the receiver base (see e.g., FIG. 14) are visible to a worker or third parties. Further, the outer edges of the insert, receiver base, and locking tabs may be chamfered to further reduce the potential of snags or hang ups. Cover 20 may be configured to leave the pivot corner of the locking tab, or at least exterior surface 51 of each locking tab 14, exposed for easy access.

Each top portion of the locking mechanism 52/54 engages one side of the insert projection 44 to retain and hold the insert projection within cavity 18 that is bordered by the receiver base, the chocks, and the first and second arms of each locking tab. To disconnect (unlock) the insert from the cavity, a user applies force on exterior surface 51 located near the pivot point on each locking tab in order to cause rotational movement of each second arm of the locking tab relative to its corresponding first arm of the locking tab. The second arm applies a force on the insert projection leading edge 46 and the first arm no longer engages the sides of insert projection 44. Exterior surface 51 may include knurling or other surface roughening for a worker to more easily engage the point of disconnection on locking tab.

Figure 25:
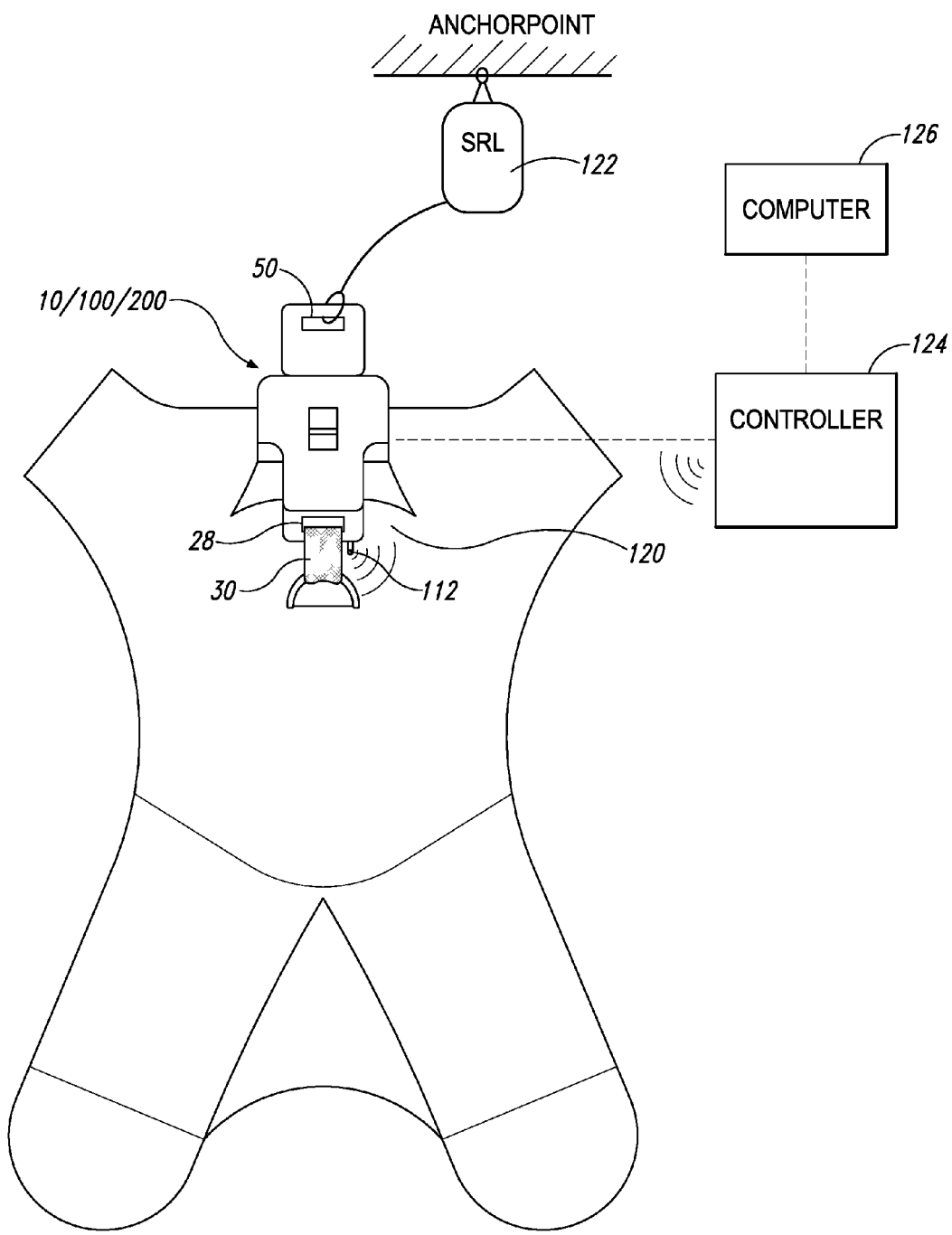
FIG. 25 is a schematic view of the locking mechanism connecting two devices together and electronically connected to a controller to signal to an optional computer when the connection is broken.

In use, as illustrated in FIG. 25, locking mechanism 10 may be used to connect two devices together through attachment of the two devices to the insert and the receiver base, respectively. Locking mechanism 10 is particularly well suited to joining a first device, such as a safety harness 120 worn by a worker, that includes or is connected to safety straps, webbing, or cable, or some form of connector, where the safety strap, webbing, cable, or connector engages the receiver base, such as through opening 28. The insert, such as through insert opening 50, engages with a second device, such as a retractable lifeline 122, that itself includes or is connected to safety straps, webbing, cable, or connector. Other engagement means can be used such as those illustrated in FIGS. 17 and 18.

Referring now to FIGS. 12-15 and 19, a second embodiment locking mechanism 100 is directed to two-stage locking verification. Similar to locking mechanism 10 above with one-stage mechanical locking, second embodiment 100 includes the same one-stage mechanical locking features above. The same numeral designations are used to describe the second embodiment locking mechanism's mechanical locking functionality. That is that the second embodiment locking mechanism includes a receiver base 12, a pair of locking tabs 14, an insert 16.

However, receiver base 12 also includes an electronic bay 102 that includes various electronic components to verify that insert 16 is fully engaged into cavity 18 and latched by locking tabs 14. The electronic components send a signal to an external device (such as a computer) that determines whether the locking mechanism can open and release the insert through the first locking means.

Figure 19:
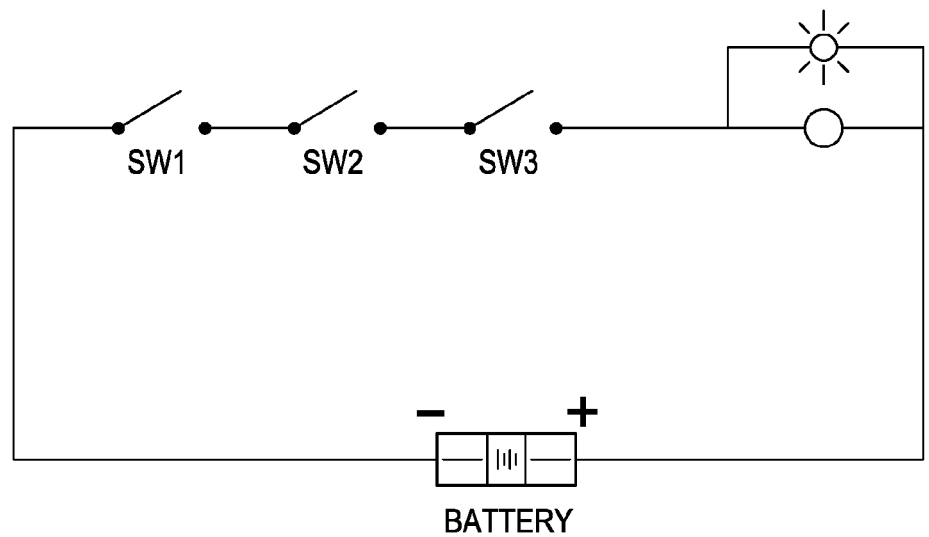
FIG. 19 is a schematic solid state wiring diagram of the electronic components of the harness side Bluetooth board.
Figure 20:
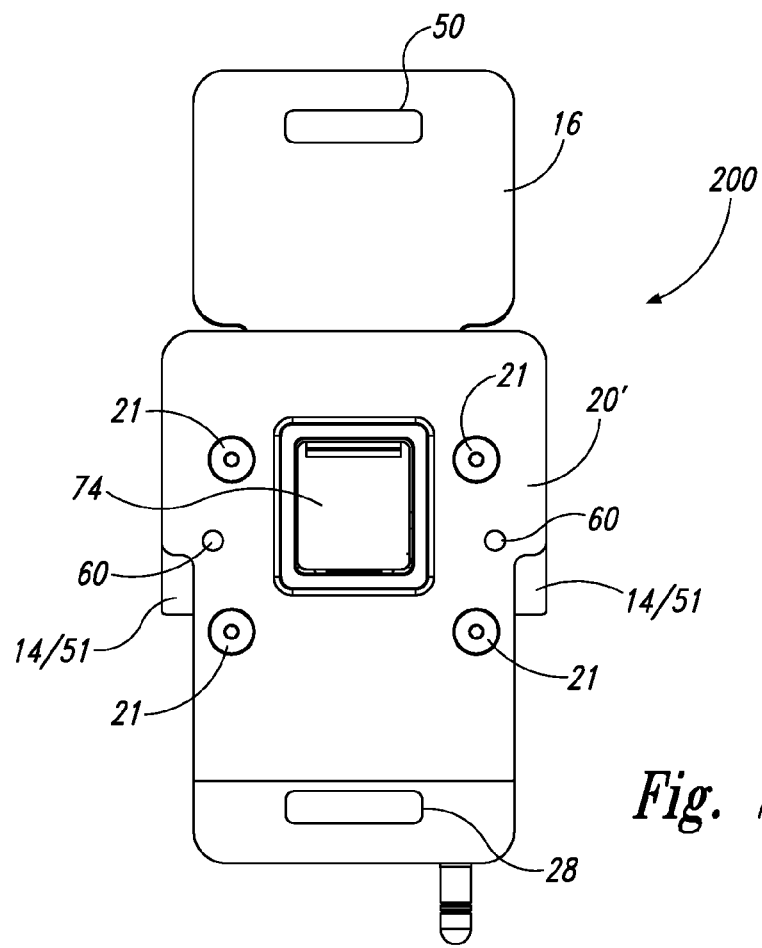
FIG. 20 is a front view of an another alternate embodiment disclosing a secondary or tertiary locking element with an optional press button mechanism.
Figure 21:
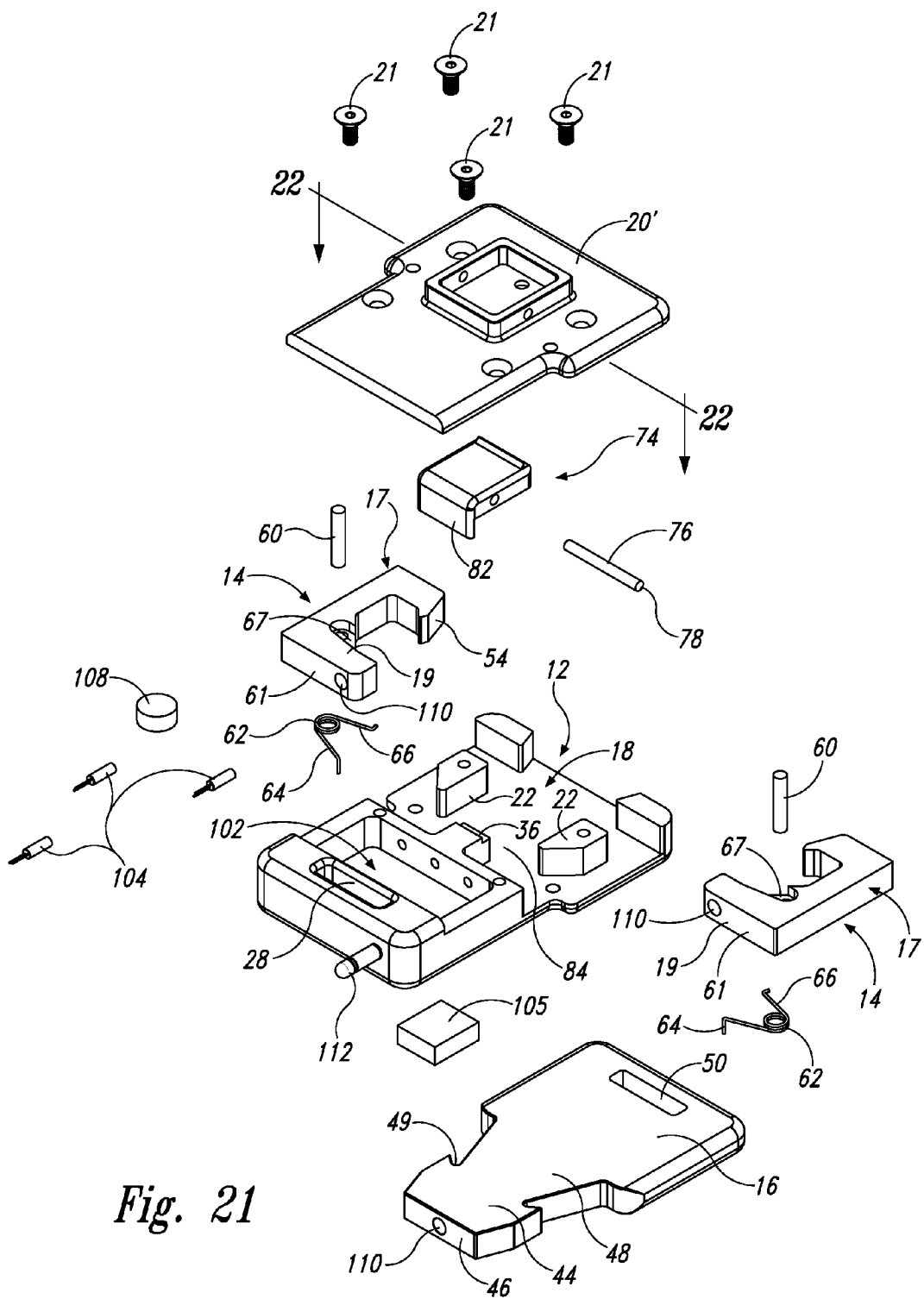
FIG. 21 is an exploded front view of the embodiment of FIG. 20.

Referring also to FIG. 19, electronic components may include embedded reed switches 104, a circuit board 105, a relay 106, embedded shielded proximity switches, a pressure switch that has mechanical engagement, an optical sensor, and optional indicator light (e.g., LED light) and a battery 108. These are positioned within the electronic bay 102. There are also magnetic actuators 110, preferably three, to match a corresponding reed switch 104. Magnetic actuators 110 are positioned outside the electronic bay (see for example FIG. 21).

The reed switches 104 may be a Hamlin 59010 Firecracker (3 mm dia., 9 mm long). They will be activated by the magnetic actuators placed in three locations opposite the reed switches. One location will be at the end of the insert, another under the left hand locking tab, and the remaining one under the right hand locking tab. All three switches will normally be in the open position until the magnetic actuator changes their state.

After all three switches are closed by the mechanical action of inserting the insert into the receiver base cavity (one-stage locking), then the electronic components will receive electrical energy from the battery. After the electronic components have communicated via various protocols, such as Bluetooth, near field communication, RFID, Zigbee, or other wireless communication means, that the mechanical (stage one) locking has taken place, a remote computer/processor processes the safe signal, that may be sent via a wireless antenna 112 (see e.g., FIG. 13), received with an aperture 111 within receiver base 12, and will close the dry contacts, such as on a machine interface board (not illustrated). The sensed signal will block electrical signals to an affected machine control function (stage two). Here, in the second stage, the locking mechanism 100, through mechanical closure, triggers a communication between the locking mechanism 100 to a machine (not illustrated) that may be attached to or a controller 124 (see e.g., FIG. 25) that may be interfaced with a machine or multiple machines or to a complete overall monitoring system.

The two-stage locking mechanism with verification capabilities (e.g., remote processor signaling) is particularly useful for dangerous applications where human life (or safety) is at risk or where sensitive expensive equipment is at risk. One application for the two-stage locking mechanism 100 is between a worker in a safety harness 120 and a retractable lifeline 122 where an employer (or construction boss) needs to ascertain with more certainty whether it is safe for a worker to detach from a lifeline. The connection or disconnection can be signaled to a controller 124, which can be forwarded to a computer device 126 that can be networked with an internal or external safety monitor command center (not illustrated). Further, the locking mechanism (10 or 100) allows a worker to remove him or herself from a lifeline without removing the worker's safety harness.

Figure 18:
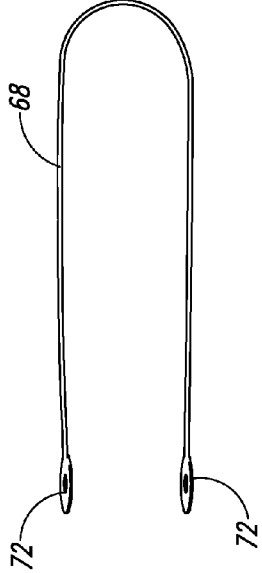
FIG. 18 is a schematic view of a cable that may be received by the alternate attachment means disclosed in FIG. 17.
Figure 17:
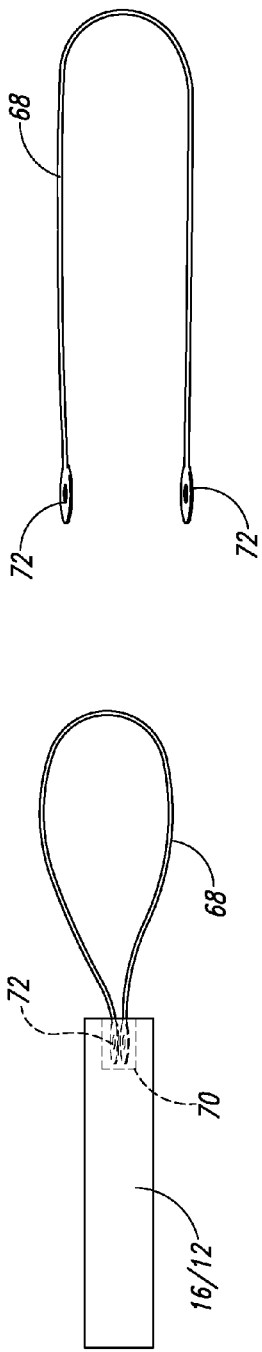
FIG. 17 is a schematic view of an alternate strap attachment means.

FIGS. 17 and 18 illustrate a different means for engaging a cable 68 or strap. Instead of a safety strap being threaded between openings 28 and 50 of the receiver base and insert, respectively, the cable or strap ends are captured within an opening 70 that opens through the outer edge of the receiver base and/or insert as illustrated in FIG. 17. Cable or strap 68 includes flexible expanding end portions 72 that can be inserted into opening 70 but cannot come out without cutting the cable/strap. Alternatively, cable ends can be epoxied or other permanent fastening means within opening 70.

FIGS. 20-24 disclose another alternate embodiment locking mechanism 200 with either secondary or tertiary locking verification means. Locking mechanism 200 can be used in connection with the one-stage locking verification means found in locking mechanism 10 or used with locking mechanism 100 (two-stage locking verification means), depending on the type of application that is desired. Locking mechanism 200 contains a receiver base 12, a pair of locking tabs 14, and an insert 16 all like those elements described in detail above. Cover 20' however is different from cover 20 in that it is adapted to accommodate a centrally positioned push button mechanism 74.

Push button mechanism 74 includes a centrally positioned rod 76 that extends past the confines of a mechanism housing 75 to form ends 78. The mechanism housing is operably connected to a spring 80 that is biased against the interior of the receiver base.

Figure 22:
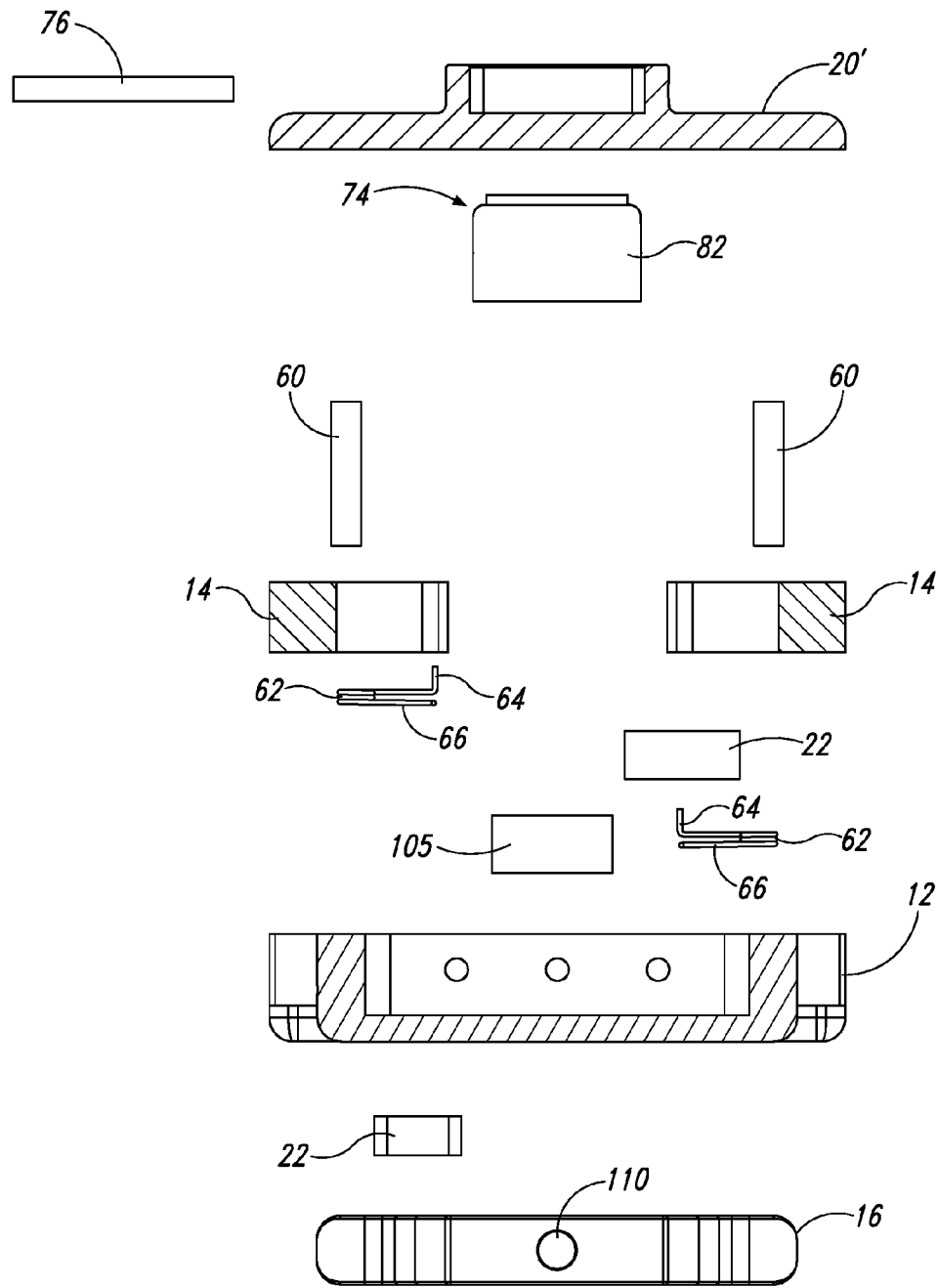
FIG. 22 is a bottom exploded view of the embodiment of FIG. 20.
Figure 23:
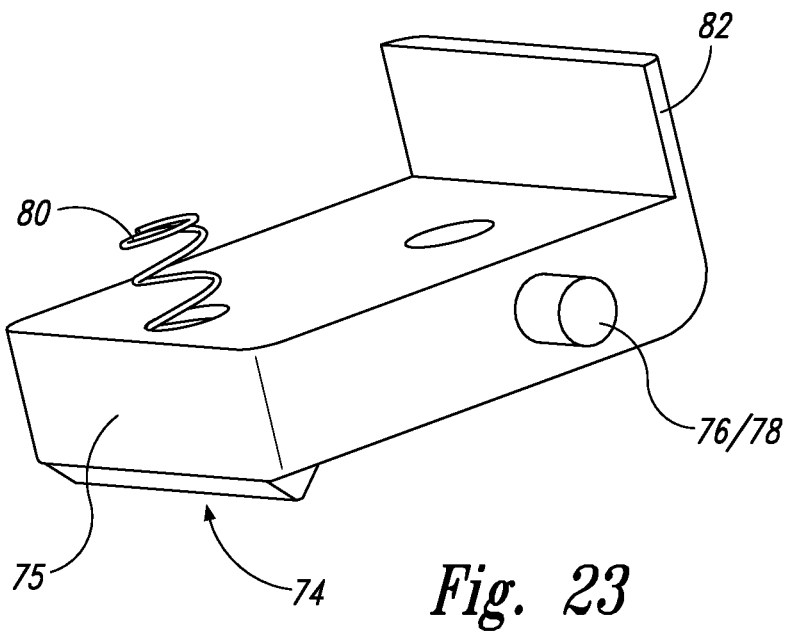
FIG. 23 is an enlarged bottom perspective view of the press button mechanism of FIG. 20.
Figure 24:
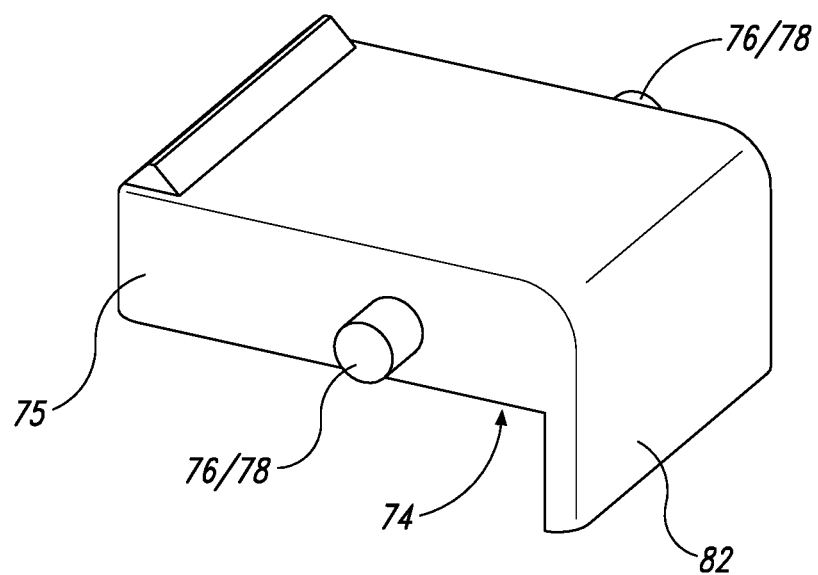
FIG. 24 is an enlarged top perspective view of the press button mechanism of FIG. 20.

During locking action, a lower lip 82 extends from mechanism housing 75 that engages with a slot or indent within the receiver base 84, such as on central abutment member 36, (FIG. 22). Lower lip 82 also is positioned directly above upper surface 59 of each locking tab lower arm. The physical relationship between the lower lip 82 and the locking tab lower arms, which may be touching but does not need to be, keeps the locking tabs from rotational movement until the button retracts the lower lip and the two locking tabs are rotated to disengage the insert projection from the cavity.

Torsion springs 62, as discussed above, may be embedded under each locking tab to keep inward tension of the locking tabs. The torsion springs mount around a respective cylindrical post (or pivot pin) to tension the spring with regard to its corresponding locking tab so that a user would need to squeeze them with approximately 5 lbs of pressure in order to release (pivot) the locking tabs.

When pressing the push button mechanism 74, it retracts the lower lip 82 and, therefore, disengages with the indent or slot 84 in receiver base 12 and no longer stops the lower arms of the locking tabs from rotation (and displacement of the leading edge of the insert). Then a user may squeeze on the two locking tabs at the same time as the push button is depressed to effectuate three point mechanical unlocking of the locking mechanism 10.

If used with the locking mechanism 100, the push button mechanism 74 along with the pivotable locking tabs act as a tertiary locking action to the two-stage locking verification means described to locking mechanism 100 (mechanical locking of the insert in the first stage, and electronic locking means of the second stage). In this embodiment, the push button must be depressed at the same time as depressing the locking tabs in order to pivot the locking tabs to disconnect (unlock) the insert from the locking tabs and receiver base cavity. The push button and two locking tabs form a three point contact before locking or unlocking can take place.

The locking mechanisms 10, 100, 200 may be made of metal or man-made materials. In one form of the invention, locking mechanisms 10, 100, and 200 are made of aluminum. In another form they are made from carbon fiber as a strong, yet lightweight, alternative.

It is to be understood that many changes in the particular structure, materials, and features of the invention may be made without departing from the spirit and scope of the invention. Therefore it is the Applicant's intention that its patent rights not be limited by the particular embodiments illustrated and described herein, but rather by the following claims interpreted according to accepted doctrines of claim interpretation, including the Doctrine of Equivalents and Reversal of Parts.

The invention claimed is:

1. A locking mechanism, comprising:
   a pair of locking tabs, each locking tab having a first arm and a second arm; wherein each locking tab is spaced apart relative to a receiver base having an upper portion and a lower portion and each locking tab is configured to pivot about a respective pin operatively connected to the receiver base, and wherein a cavity is formed between the two locking tabs and the upper portion of the receiver base,
   the lower portion of the receiver base configured to be engageable with a first device;
   an insert having a lower portion configured with a leading edge and an upper portion; the lower portion of the insert being configured to be received within the cavity and to be engaged by the first arm of each locking tab to keep the insert retained within the cavity; the upper portion of the insert is configured to be engageable with a second device;
   three magnetic actuators configured to be positioned respectively at a lower surface of the second arm and leading edge of the insert; and
   an electronic switch for each magnetic actuator, wherein each electronic switch is positioned within the receiver base and configured to mate with its respective magnetic actuator.

2. The locking mechanism according to claim 1 wherein the upper portion of the insert defines an opening that is configured to be engageable with the first device and the lower portion of the receiver base defines an opening that is configured to be engageable with the second device and wherein the opening of the insert and the opening of the receiver base are aligned one above the other.

3. The locking mechanism according to claim 1 further comprising a push button assembly having a retractable lip that is configured to engage with an indentation within the receiver base to block rotational movement of the second arm of each locking tab when locked.

4. The locking mechanism according to claim 3 wherein the upper portion of the insert defines an opening that is configured to be engageable with the first device and the lower portion of the receiver base defines an opening that is configured to be engageable with the second device and wherein the opening of the insert and the opening of the receiver base are aligned one above the other.

5. A method of locking one device to another, the method comprising:
   providing a first device having an engageable end;
   providing a second device having an engageable end;
   providing a receiver base having an upper portion and a lower portion having an engagement member;
   providing a pair of locking tabs wherein each locking tab has a first arm and a second arm connected by a joint; said locking tabs being spaced apart relative to the upper portion of the receiver base to form a cavity;
   providing a pair of pivots and a pair of torsion springs;
   positioning each locking tab joint between one of the torsion springs against the receiver base to pivot about one of the pivots;
   providing an insert having lower portion with a leading edge and an upper portion having an engagement member; the lower portion configured to be engageable with the first arms of the locking tabs;
   inserting the lower portion of the insert into the cavity where the second arm of each locking tab is positioned below the leading edge of the insert;
   engaging the lower portion of the insert by the first arm of each locking tab;
   connecting the first device's engagement end with the upper portion engagement member;
   connecting the second device's engagement end with the engagement member
   providing three magnetic actuators;
   positioning the magnetic actuators respectively at a lower surface of the second arm and leading edge of the insert;
   providing an electronic switch to correspond to each magnetic actuator;
   positioning each electronic switch within the receiver base to mate with its respective magnetic actuator; and
   means for wirelessly controlling connection of the magnetic actuators to the electronic switches.

6. The method according to claim 5 wherein the upper portion of the insert defines an opening that is configured to be engageable with the first device and the lower portion of the receiver base defines an opening that is configured to be engageable with the second device and wherein the opening of the insert and the opening of the receiver base are aligned one above the other.

7. The method according to claim 5 further comprising:
   providing a push button assembly having a retractable lip that is configured to engage with an indentation within the receiver base; and
   blocking rotational movement of the second arm of each locking tab when the push button is not engaged.

8. A method of verifying when one device is unlocked from another device, the method comprising:

providing a receiver base having an upper portion and a lower portion having an engagement member that is operably engaged with a first device;

providing a pair of locking tabs wherein each locking tab has a first arm and a second arm connected by a joint that is rotatably connected to the upper portion of the receiver base; said locking tabs being spaced apart relative to the upper portion of the receiver base to form a cavity, wherein when the joint of each locking tab rotates, the first arm of each locking tab extends past an outer edge of the receiver base;

providing an insert having lower portion with a leading edge and an upper portion having an engagement member; the lower portion of the insert being engaged by the first arms of the locking tabs; the upper portion having an engagement member that is operably engaged with a second device; the insert being inserted;

applying a force to the first arm of each locking tab adjacent the joint of each locking tab where the second arm of each locking tab disengages the leading edge of the insert and making visible a portion of each first arm relative to the receiver base;

providing three magnetic actuators;

positioning the magnetic actuators respectively at a lower surface of the second arm and leading edge of the insert;

providing an electronic switch for each magnetic actuator;

positioning each electronic switch within the receiver base to mate with its respective magnetic actuators; and controlling contact between the electronic switches and their respective magnetic actuators.

9. The method according to claim 8 wherein the upper portion of the insert defines an opening that is configured to be engageable with the first device and the lower portion of the receiver base defines an opening that is configured to be engageable with the second device and wherein the opening of the insert and the opening of the receiver base are aligned one above the other.

10. The method according to claim 8 further comprising:

providing a push button assembly having a retractable lip that is configured to engage with an indentation within the receiver base; and blocking rotational movement of the second arm of each locking tab when the push button is not engaged.

11. The method according to claim 8 further comprising:

providing signaling means to convey status of contact between the electronic switches and their respective magnetic actuators;

providing an external controller; and signaling status of contact between the electronic switches and their respective magnetic actuators to the controller.

12. The method according to claim 11 wherein the signal means is accomplished via a wireless antenna.

13. The method according to 11 further comprising providing a computer that is communicatively engaged with the controller and wherein command signals come from the computer to separate the contact between the electronic switches and their respective magnetic actuators.

* * * * *